(12) United States Patent
Starling et al.

(10) Patent No.: US 9,458,302 B1
(45) Date of Patent: Oct. 4, 2016

(54) EXTRUDABLE VEHICULAR FLOOR MAT USING RECYCLED CONTENT

(71) Applicant: International Automotive Components Group North America, Inc., Southfield, MI (US)

(72) Inventors: Matt Starling, Sandusky, OH (US); Joe Bedogne, Troy, MI (US); William J. Tansey, Lee, NH (US); Rose Ann Ryntz, Clinton Township, MI (US)

(73) Assignee: International Automotive Components Group North America, Inc., Southfield, MI (US)

( * ) Notice: Subject to any disclaimer, the term of this patent is extended or adjusted under 35 U.S.C. 154(b) by 0 days.

(21) Appl. No.: 14/825,931

(22) Filed: Aug. 13, 2015

(51) Int. Cl.
*C08J 11/04* (2006.01)
*C08J 11/06* (2006.01)

(52) U.S. Cl.
CPC ............. *C08J 11/06* (2013.01); *C08J 2323/02* (2013.01); *C08J 2423/02* (2013.01); *C08J 2475/04* (2013.01)

(58) Field of Classification Search
CPC ...................................................... B29B 17/02
USPC ................. 521/40, 45.5, 47, 59, 60, 81, 139
See application file for complete search history.

(56) References Cited

U.S. PATENT DOCUMENTS

| | | |
|---|---|---|
| 5,725,926 A | 3/1998 | Wang |
| 8,329,810 B2 | 12/2012 | Rikhoff et al. |
| 2004/0048035 A1 | 3/2004 | Bailey et al. |
| 2011/0039051 A1 | 2/2011 | Flowers, Jr. et al. |

FOREIGN PATENT DOCUMENTS

WO          01/74206 A2      10/2001

*Primary Examiner* — Terressa Boykin
(74) *Attorney, Agent, or Firm* — Grossman, Tucker, Perreault & Pfleger, PLLC

(57) ABSTRACT

The present invention relates generally to the manufacture of vehicular floor mats using recycled content. In particular, the present disclosure identifies the ability to form extrudable floor mats suitable for interior vehicular applications where the recycle content includes recycling of selected amounts of a laminate of crosslinked polyolefin foam and thermoplastic polyolefin resin.

21 Claims, No Drawings

EXTRUDABLE VEHICULAR FLOOR MAT USING RECYCLED CONTENT

FIELD OF THE INVENTION

The present invention relates generally to the manufacture of vehicular floor mats using recycled content. In particular, the present disclosure identifies the ability to form extrudable floor mats suitable for interior vehicular applications where the recycle content includes recycling of selected mounts of a laminate of crosslinked polyolefin foam and thermoplastic polyolefin resin.

BACKGROUND

Vehicular floor mats are a common accessory for many vehicles, as part of an effort to protect carpeting and other interior components. As vehicular floor mats derive from various polymer resin compositions, it would be useful to identify particular polymer resin compositions, from recycling channels, that may be suitable to otherwise satisfy the performance requirements of floor mats that are often used in various demanding environments.

The problem alluded to above is that vehicular floor mats must be, e.g., sufficiently strong to withstand the abuse of different types of shoes and different abrasive action when entering or leaving a vehicle as well as when the driver is operating the vehicle. In addition, vehicular mats must endure various chemicals and debris. Ideally, vehicular mats are such that they desirably absorb or otherwise manage noise while providing an attractive surface appearance.

Given the relatively large volume of vehicular mats therefore produced and sold, there is an increasing demand to develop vehicular floor mat compositions that may be sourced from recycled resins and otherwise provide an environmentally more friendly vehicular floor mat that may also satisfy one or more of the property requirements noted above.

SUMMARY

A method for forming a recycled composition for a vehicular mat comprising:

(a) supplying 40.0% wt. to 60.0% wt. of a preformed skin-foam laminate wherein the skin comprises a thermoplastic olefin and the foam comprises a crosslinked polyolefin;

(b) supplying 10.0% wt. to 20.0% wt. of a polyolefin elastomer;

(c) supplying one or more of the following:
0.1 wt. % to 5.0 wt. % of a lubricant;
0.05 wt. % to 0.5 wt. % of a metal salt of a carboxylic acid;
20.0 wt. % to 40.0 wt. % of an inorganic salt filler;

(d) combining the preformed skin-laminate, polyolefin elastomer and one of more of said lubricant, metal salt of a carboxylic acid and inorganic salt filler and melt processing and forming a recycled molded composition.

A method for forming a recycled composition comprising:

(a) forming a mixture of 40.0% wt. to 60.0% wt. of a preformed skin-foam laminate wherein the skin comprises a thermoplastic olefin and the foam comprises a crosslinked polyolefin,
10.0% wt. to 20.0% wt. of a polyolefin elastomer, 0.1 wt. % to 5.0 wt. % of a lubricant, 0.05 wt. % to 0.5 wt. % of a metal salt of a carboxylic acid and 20.0 wt. % to 40.0 wt. % of an inorganic salt filler; and (b) melt processing said mixture and forming a material having a tensile strength of at least 4.0 MPa and an elongation of at least 500%.

A recycled composition comprising:
40.0% wt. to 60.0% wt. of a preformed skin-foam laminate wherein the skin comprises a thermoplastic olefin and the foam comprises a crosslinked polyolefin;
10.0% wt. to 20.0% wt. of a polyolefin elastomer;
one or more of the following: (1) 0.1 wt. % to 5.0 wt. % of a lubricant; (2) 0.05 wt. % to 0.5 wt. % of a metal salt of a carboxylic acid; and (3) 20.0 wt. % to 40.0 wt. % of an inorganic salt filler.

DETAILED DESCRIPTION OF THE PREFERRED EMBODIMENTS

The present disclosure relates to the manufacture of a vehicular floor mat using recycled content. More specifically, the vehicular floor mats produced herein preferably utilizes recycled content that amounts to recycling of a previously formed skin-foam laminate material. More specifically, the skin-foam bilaminate material suitable for recycling herein is one that comprises a thermoplastic olefin skin that is laminated to a cross-linked polyolefin foam layer. Such skin-foam laminates may be sourced from what is often time identified as automotive hard trim scrap, from the manufacture of, e.g., instrument panels and door components. That is, in such hard trim scrap there is often a skin foam layer attached to an underlying hard panel (such as a polycarbonate/acrylonitrile-butadiene-styrene resin). Such skin-foam laminate may now be successfully recycled herein and reused as an interior vehicular floor mat material.

Reference to a thermoplastic polyolefin is reference to those polymer resins that include some amount of olefin resin such as polypropylene and/or polyethylene. Such resins therefore may include blends of an olefin resin and an elastomer (e.g. ethylene-propylene rubber, ethylene-propylene diene rubber, styrene-ethylene-butadiene styrene rubber) in which the olefins are the major continuous phase and the elastomer is a relatively minor dispersed phase. These blends may be preferably created either by melt blending or by reactor manufacture. TPO's exhibit both thermoplastic (capable of melt processing) and elastomeric properties, i.e., the materials process as thermoplastics but have some physical properties possessed by elastomers such as relatively high elongations of over 50%. More preferably, the elongations will fall in the range of 100% to 250%. The thermoplastic polyolefins herein will also preferably have a density in the range of 0.85 g/cc to 1.1 g/cc.

The other component of the bilaminate that is recycled herein is a crosslinked polyolefin foam layer, which may therefore include crosslinked polyethylene or crosslinked polypropylene. Reference to crosslinked is reference to the feature that a portion of the polymer chains are covalently crosslinked, which may be achieved by irradiation or chemical treatment. Such crosslinking will typically improve mechanical properties and thermal stability. One particular form of crosslinked polyolefin foam that is preferably recycled herein includes crosslinked polyolefin foam that is available from Sekisui-Voltek, under the trade names VOLARA™, which foam may have a density from 2 pcf to 20 pcf and a thickness of 0.010" to 2.00", more preferably 0.075" to 0.165". Such foams also indicate a tensile strength in the machine direction that falls in the range of 60 psi to 200 psi, depending upon density. The foams also have a compression set (ASTM D 2240) in the range of 8% of original thickness to 25% of original thickness.

The skin-foam laminates that are recycled herein are preferably those where the weight percent of thermoplastic polyolefin is about 10.0% wt. to 35.0% wt. and the corresponding weight percent of crosslinked polyolefin foam is 90.0% wt. to 65.0% wt. With respect to the final recycled material produced herein, the skin-foam laminate itself is preferably present in the recycled mixture at a level of 40.0% wt. to 60.0% wt. The skin-foam bilaminate herein may be preferably and initially melt processed and formed into pellets for further recycling herein and formation of a vehicular mat, or used directly in any of the recycled mat formulations described herein.

The recycling of the skin foam-laminate noted above has been found to be effectively improved by the addition of a polyolefin elastomer which is included to increase melt strength and/or impact characteristics of the final recycled resin. Preferably, the polyolefin elastomer is a functionalized polyethylene resin such as an ethylene-maleic anhydride copolymer and may include up to 8% ethylene-vinyl acetate copolymer. Such polyolefin elastomer preferably has a density in the range of 0.85 g/cc to 0.92 g/cc, more preferably in the range of 0.85 g/cc to 0.90 g/cc, and in particular can have a density of 0.87 g/cc. The melt index is preferably in the range of 3 g/10 min to 7 g/10 min, more preferably, in the range of 4 g/10 min to 6 g/10 min. The tensile strength at break is preferably in the range of 800 psi to 1200 psi, more preferably 900 psi to 1100 psi. The elongation to break is preferably in the range of 1700% to 2100%, and more preferably, in the range of 1800% to 2000%. The Shore A hardness is preferably in the range of 50 to 70, more preferably 55 to 65. The resins preferably have a melting point in the range of 115° C. to 125° C. One particular preferred polyolefin elastomer includes a material sold by Spartan Polymer, Inc., under the name Enhance Recoil MMI. Preferably, the level of such polyolefin elastomer that may be included in the recycling of the skin-foam laminate is such that it is present in the recycled mixture at a level of 10.0% wt. to 20.0% wt. More preferably, the level of the polyolefin elastomer may be in the range of 13.0% wt. to 17.0% wt., and in one particularly preferred embodiment, the level of polyolefin elastomer is present at a level of 15.0% wt.

A variety of other ingredients may then optionally be employed to improve the recycling of the above laminate material to round out any given formulation. That is, one or more of the following ingredient discussed below is included such that the ingredients in the recycled formulation add-up to 100% wt. Accordingly, it can be appreciated that the particular ingredient selected below, and its corresponding amount, may vary.

The first such ingredient that may optionally be used to improve the recycling of the skin-foam laminate herein is what is identified as a lubricant or processing oil. Such may be understood as an additive that improves the processing of the recycled mixture by improving the flow properties (e.g. reducing overall viscosity) and/or reducing the adherence of the recycled mixture to machine parts. Such lubricants may preferably be selected from hydrocarbons and in particular aliphatic based hydrocarbons that are liquid or waxes at room temperature. These may be selected from natural paraffin, synthetic paraffin, polyethylene waxes and/or polypropylene waxes. In general, such materials are those that have a MW of less than or equal to 2500 g/mole. One particularly preferred lubricant or processing oil that may be utilized herein includes an aliphatic/naphthenic oil, which is reference to a hydrocarbon type oil that specifically includes cycloparaffin type components. Such aliphatic/naphthenic oil is available from Eastern Oil Company and sold under the trade name PON1250. The lubricant or processing oil herein may therefore optionally be present in the recycling of the skin-foam laminate at a level of 0.1 wt. % to 5.0 wt. %, more preferably in the range of 1.0 wt. % to 3.0 wt. %, and in a particularly preferred embodiment, the lubricant or oil is present at a level of 2.5 wt. %.

The next ingredient that is optionally included to improve recycling of the skin-foam laminate herein is what is identified as another processing aid, sourced from metal salts of carboxylic acids. For example, such may include metal salts such as zinc stearate and/or calcium stearate. Such metal salts may preferably be sourced from Struktol under the trade name SA1335, which is a zinc stearate composition. To improve the distribution of the zinc stearate in the recycling herein one may preferentially and initially disperse the zinc stearate in a hydrocarbon oil base, such as a polyethylene/polyester base, such as a formulation containing 20% wt. zinc stearate and 80% wt. of the hydrocarbon oil base. Such metal salts may optionally be present in the recycling of the skin foam laminate at a level of 0.05 wt. % to 0.5 wt. %, more preferably, 0.05 wt. % to 0.20 wt. %, and most preferably, 0.1 wt. %.

Finally, the remaining optional ingredient that one may utilize to improve the recycling of the skin-foam laminate herein is an inorganic salt filler, which may be included to modify one or more properties, such as increasing density, reduce shrinkage, increase hardness, increase heat distortion temperature, and cost reduction. Such may therefore include salts such as inorganic metal carbonates, such as calcium carbonate and/or magnesium carbonate. The inorganic metal salt fillers may optionally be present in the recycling of the skin-foam laminate herein at a level of 20.0% wt. to 40.0% wt., more preferably 25.0% wt. to 35.0% wt., and in a particularly preferred embodiment, the inorganic metal salt filler is present at a level of 30.0 wt. % to 35.0 wt. %.

The skin-foam laminate herein, optionally with one or more of the above additional ingredients, is preferably recycled herein by melt processing, such as by extrusion, in preferably on a twin-screw type extruder. The extruder is preferably fed at a rate of about 5 kg/hr to 15 kg/hr, more preferably at a rate of about 8 kg/hr to 12 kg/hr, and in a most preferred embodiment, at a rate of 10 kg/hr. Barrel pressure is preferably set in the range of 600 psi to 800 psi, more preferably in the range of 650 psi to 750 psi. The extruder is preferably a multi-zone extruder where one may employ a temperature profile of selected temperatures in the range of 100° C. to 200° C. In one particular preferred embodiment, the extruder is a multi-zone twin-screw extruder which as the following zone heating profile set temperatures, extending from the feed throat region to the extruder nozzle: Zone 1: 190° C., Zone 2: 193° C.; Zone 3: 193° C.; Zone 4: 190° C.; Zone 5: 190° C.; Zone 6: 190° C.; Zone 7: 121° C.; Zone 8: 121° C.; Zone 9: 149° C.; Zone 10: 171° C. It is noted that the reduction in the temperatures set for Zones 7 through Zone 9 is due to the feature that there is then sufficient shearing and corresponding heating to allow for reduced set temperatures at such location of the extruder barrel.

Melt processing of the skin-foam laminate herein is therefore such that it will allow for melt processing and formation of recycled material suitable for use as a vehicular mat, in a desired dimension and thickness for a given mat application. Accordingly, the melt processing of the preformed skin-laminate herein by extrusion and/or injection molding will provide a molded composition. For example, the recycled material may itself preferably be molded by extrusion processing to have a length in the range of 1.5 ft to 6.0 ft and a width in the range of 2.0 ft. to 6.0 ft and at a thickness in the range of 1.0 mm to 4.0 mm. Along such lines, an exemplary recycled formulations were prepared that included the following ingredients described herein:

TABLE 1

Recycled Mat Formulation

| Component | Wt. % |
|---|---|
| Skin Foam Laminate (thermoplastic olefin skin laminated to crosslinked polypropylene) | 50 |
| Polyolefin Elastomer (Enhance Recoil MMI) | 15 |
| Processing Aid ( PON 1250B) | 2.5 |
| SA 1355 (20% zinc stearate/80% ester processing aide) | 0.5 (providing 0.1 wt. % zinc stearate) |
| Calcium Carbonate | 32 |

For comparison purposes, a typical virgin mat formulation was prepared that included the following ingredients:

TABLE 2

Virgin Mat Formulation

| Component | Wt. % |
|---|---|
| Engage DA 22 (polyolefin elastomer) | 27.5 |
| Engage DA 53 I | 5.0 |
| SA 1355 (20% zinc stearate/80% ester processing oil) | 0.7 (providing 0.14 wt. % zinc stearate) |
| Ateva 2810 (ethylene-vinyl acetate copolymer) | 27.5 |
| Processing Aid PON 1250B | 4 |
| Carbon Black | 0.3 |
| Calcium Carbonate | 35 |

Following the above, testing was conducted to evaluate the recycled mat formulation identified in Table 1 with the virgin mat formulation identified in Table 2:

TABLE 3

Property Comparison Recycled Mat v. Virgin Formulation

| Sample | FOG:GMW3235 | Tensile ASTM D5034 | Tensile & Elongation GMW147/ ISO 37 | Tear Strength(N) NEW Moo 76 Sec 13 | MFR 190° C. 21.6 KG | TO Stiffness Test | Tensile Strength at Break ASTM D412 | Tensile Elongation at Break ASTM D412 |
|---|---|---|---|---|---|---|---|---|
| Recycled Mat (Table 1) | 1.04 | 586N | 4.64 MPa (Tensile) 566% (Elongation) | 158.5N | 93.42 g/ 10 min | 33.73 | N/A | N/A |
| Virgin Formulation (Table 2) | 0.77 | 693N | 14.0 MPa (Tensile) 601% (Elongation) | 190N | 221.29 g/ 10 min | 52.37 | 10,539 MPa | 816.4% |

In the above, FOG:GMW3235 is reference to a General Motors Worldwide testing determination of the relative fogging tendency of an interior automotive component, GMW147 is a corresponding testing protocol of the indicated tensile and elongational properties, TO is reference to Tinnius Olsen stiffness testing.

As can be observed from the above, recycling of the skin-foam laminate herein provides a material that is suitable for a vehicular mat and one that will have a tensile strength of at least about 4.0 MPa (ISO37). In addition, the tensile strength of the material utilized for formation of the recycled mat herein is contemplated to fall in the range of 4.0 MPa to 8.0 MPa. In addition, the elongation of the material utilized for formation of the recycled mat herein is one that will have a minimum elongation of 500%, and one that is contemplated to fall in the range of 500% to 700%. The tear strength of the recycled mat is also seen to have a minimum value of about 150 N and is contemplated to fall in the range of 150 N to 180 N. Furthermore, the melt flow rate of the recycled material composition herein has a value of greater than 80 g/10 min, more preferably in the range of 80 g/10 min to 125 g/10 min.

Subsequent to the recycling of the skin-foam laminate noted herein, and the formation of a recycled mat for a vehicular application, it was next recognized that a still further recycling formulations could be prepared, and be formed into a recycled mat, and in particular, one that could include recycled crosslinked polyurethane foam. That is, the above identified formulation for forming of a recycled mat, comprising 40.0% wt. to 60.0% wt. of a preformed skin-foam laminate wherein the skin comprises a thermoplastic olefin and the foam comprises a crosslinked polyolefin, 10.0% wt. to 20.0% wt. of a polyolefin elastomer, and one or more of 0.1 wt. % to 5.0 wt. % of a lubricant, 0.05 wt. % to 0.5 wt. % of a metal salt of a carboxylic acid or 20.0 wt. % to 40.0 wt. % of an inorganic salt filler, may also include 5-15% wt. of a crosslinked polyurethane foam. Such ingredients then may be melt processed and formed into a recycled molded composition. This formulation, when extruded and formed into mat, indicates a FOG GMW of 1.06, Tensile ASTM D5034 of 314 N, Tensile and Elongation GMW147/ISO 37 of 14.0 MPa and 601%, Tear Strength (N) New Moo76, Sec. 13 of 139N, Tinnius Olsen stiffness of 51.68, Tensile Strength at Break ASTM D412 of 4605 MPa, Tensile Elongation at Break ASTM D412 of 442%.

More preferably, it was found that one could form another recycled formulation that contains: (1) 25 wt. % to 45 wt. % of the previously formed skin-foam laminate material, which as noted, is preferably composed of a thermoplastic olefin skin laminated to cross-linked polyolefin foam; (2) 40 wt. % to 60 wt. % of a regrind whose preferred composition is noted below and contains crosslinked polyurethane foam; (3) 0.1 wt. % to 0.5 wt. % of antioxidant; (4) 0.1 to 5.0 wt. % of a lubricant or processing oil; (5) 10 wt. % to 20 wt. % of an ethylene-vinyl acetate copolymer, more preferably 10 wt. % to 15. wt. % of such copolymer, which serves to improve the compatibility of this recycled mixture.

The preferred regrind noted above is one that as noted includes and provides crosslinked polyurethane foam, and such regrind is also preferably one that may have been previously applied as a layer of a vehicular firewall, which may now be recycled as noted above. One particular layer of such firewall material that can be used for recycling itself contained 85-95% by weight of a blend of EVA, olefins, and fillers and 5.0 to 15.0% by weight of recycled crosslinked polyurethane foam. The EVA preferably has a melt index of 5 to 15 with a vinyl acetate content of 10 to 30, a 4 to 10% by weight blend of fractional to 10 melt index poly(propylene) or ethylene/propylene copolymers, 1-3% wt. of linear low density poly(ethylene) with a melt index of 80 to 200, 75-80% of the total blend weight comprised of a filler or filler blend consisting of calcium carbonate or barium sulfate, or a blend thereof.

The above various descriptions and embodiments are intended to provide a general description of the disclosure herein, and it not intended to be limiting. The preferred embodiment similarly are intended to described various preferred features of the invention, and are similarly not intended to limit the scope of the invention described herein.

The invention claimed is:

1. A method for forming a recycled composition for a vehicular mat comprising:
    (a) supplying 40.0% wt. to 60.0% wt. of a preformed skin-foam laminate wherein the skin comprises a thermoplastic olefin and the foam comprises a crosslinked polyolefin;
    (b) supplying 10.0% wt. to 20.0% wt. of a polyolefin elastomer;
    (c) supplying one or more of the following:
        0.1 wt. % to 5.0 wt. % of a lubricant;
        0.05 wt. % to 0.5 wt. % of a metal salt of a carboxylic acid;
        20.0 wt. % to 40.0 wt. % of an inorganic salt filler;
    (d) combining the preformed skin-laminate, polyolefin elastomer and one of more of said lubricant, metal salt of a carboxylic acid and inorganic salt filler and melt processing and forming a recycled molded composition.

2. The method of claim 1 wherein said thermoplastic olefin in said skin layer is present in said laminate at a level of 10.0% wt. to 35.0% wt. and said crosslinked polyolefin foam is present in said laminate at a level of 90.0% wt. to 65.0% wt.

3. The method of claim 1 wherein said crosslinked polyolefin foam in said preformed skin-foam laminate has a density of 2 pcf to 20 pcf and a thickness of 0.010" to 2.00".

4. The method of claim 1 wherein polyolefin elastomer has a melt flow index in the range of 3 g/10 min to 7 g/10 min.

5. The method of claim 1 wherein said polyolefin elastomer has a melting point in the range of 115° C. to 125° C.

6. The method of claim 1 wherein said lubricant is selected from a paraffin, synthetic paraffin, polyethylene wax or polypropylene wax having a MW of less than or equal to 2500 g/mole.

7. The method of claim 1 wherein said inorganic salt filler comprises calcium carbonate and/or magnesium carbonate.

8. The method of claim 1 above, including 5.0% wt. to 15.0% wt. crosslinked polyurethane foam.

9. A method for forming a recycled composition comprising:
    (a) forming a mixture of 40.0% wt. to 60.0% wt. of a preformed skin-foam laminate wherein the skin comprises a thermoplastic olefin and the foam comprises a crosslinked polyolefin, 10.0% wt. to 20.0% wt. of a polyolefin elastomer, 0.1 wt. % to 5.0 wt. % of a lubricant, 0.05 wt. % to 0.5 wt. % of a metal salt of a carboxylic acid and 20.0 wt. % to 40.0 wt. % of an inorganic salt filler; and
    (b) melt processing said mixture and forming a material having a tensile strength of at least 4.0 MPa and an elongation of at least 500%.

10. The method of claim 9 wherein said formed material is in the shape of a mat for a vehicle interior.

11. The method of claim 9 wherein said thermoplastic olefin in said skin layer is present in said laminate at a level of 10.0% wt. to 35.0% wt. and said crosslinked polyolefin foam is present in said laminate at a level of 90.0% wt. to 65.0% wt.

12. The method of claim 9 wherein said crosslinked polyolefin foam in said preformed skin-foam laminate has a density of 2 pcf to 20 pcf and a thickness of 0.010" to 2.00".

13. The method of claim 9 wherein polyolefin elastomer has a melt flow index in the range of 3 g/10 min to 7 g/10 min.

14. The method of claim 9 wherein said polyolefin elastomer has a melting point in the range of 115° C. to 125° C.

15. The method of claim 9 wherein said lubricant is selected from a paraffin, synthetic paraffin, polyethylene wax or polypropylene wax having a MW of less than or equal to 2500 g/mole.

16. The method of claim 9 wherein said inorganic salt filler comprises calcium carbonate and/or magnesium carbonate.

17. The method of claim 9, including 5.0% wt. to 15.0% wt. crosslinked polyurethane foam.

18. A recycled composition comprising:
    40.0% wt. to 60.0% wt. of a preformed skin-foam laminate wherein the skin comprises a thermoplastic olefin and the foam comprises a crosslinked polyolefin;
    10.0% wt. to 20.0% wt. of a polyolefin elastomer;
    one or more of the following: (1) 0.1 wt. % to 5.0 wt. % of a lubricant; (2) 0.05 wt. % to 0.5 wt. % of a metal salt of a carboxylic acid; and (3) 20.0 wt. % to 40.0 wt. % of an inorganic salt filler.

19. The recycled composition of claim 18 wherein said preformed skin-foam laminate wherein said skin layer is present in said laminate at a level of 10.0 wt. % to 35.0 wt. % and said crosslinked polyolefin foam is present in said laminate at a level of 90.0% wt. to 65.0% wt.

20. The recycled composition of claim 18 wherein said crosslinked foam in said preformed skin-foam laminate has a density of 2.0 pcf to 20 pcf and has a thickness of 0.010" to 2.00".

21. The recycled composition of claim 18 including 5.0% wt. to 15.0% wt. of a crosslinked polyurethane.

* * * * *